United States Patent
Eom et al.

(10) Patent No.: US 12,182,074 B2
(45) Date of Patent: Dec. 31, 2024

(54) FILE FRAGMENTATION REMOVAL METHOD AND DEVICE

(71) Applicant: RESEARCH & BUSINESS FOUNDATION SUNGKYUNKWAN UNIVERSITY, Suwon-si (KR)

(72) Inventors: Young Ik Eom, Suwon-si (KR); Jonggyu Park, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

(21) Appl. No.: 17/888,148

(22) Filed: Aug. 15, 2022

(65) Prior Publication Data

US 2023/0169040 A1 Jun. 1, 2023

(30) Foreign Application Priority Data

Nov. 29, 2021 (KR) .................. 10-2021-0166616

(51) Int. Cl.
  *G06F 7/00* (2006.01)
  *G06F 16/17* (2019.01)
(52) U.S. Cl.
  CPC .................. *G06F 16/1724* (2019.01)
(58) Field of Classification Search
  CPC .............. G06F 16/1724; G06F 16/162; G06F 16/2221; G06F 3/0616; G06F 3/064; G06F 3/0643; G06F 12/0292
  USPC ....... 707/693, 737, 738, 748, 785, 813, 816, 707/999.202
  See application file for complete search history.

(56) References Cited

U.S. PATENT DOCUMENTS

2011/0066666 A1* 3/2011 Takaoka ............ G06F 16/1752 711/E12.001
2013/0226923 A1* 8/2013 Thing ................ G06F 16/162 707/758
2014/0330873 A1* 11/2014 Cha .................. G06F 16/162 707/813

(Continued)

FOREIGN PATENT DOCUMENTS

JP 2001-5701 A 1/2001
JP 2011-65314 A 3/2011

(Continued)

OTHER PUBLICATIONS

Park, Jonggyu, and Young Ik Eom. "Fragpicker: A new defragmentation tool for modern storage devices." *Proceedings of the ACM SIGOPS 28th Symposium on Operating Systems Principles*. (Oct. 26, 2021) pp. 280-294.

*Primary Examiner* — Md I Uddin
(74) *Attorney, Agent, or Firm* — NSIP Law

(57) ABSTRACT

A file fragmentation removal method includes collecting input/output system call information of a plurality of file input/output system calls by an application of at least one target file used by an application operating on an arbitrary filesystem, generating a file range list of items comprising information on a start point, an end point, and an access count of input/output based on the input/output system call information, selecting a plurality of fragmentation target items based on the file range list and a predetermined threshold, and selectively removing fragmentation based on whether individual items of the plurality of fragmentation target items are fragmented.

8 Claims, 10 Drawing Sheets

(56) References Cited

U.S. PATENT DOCUMENTS

2017/0249213 A1\* 8/2017 Slik .................. G06F 3/064

FOREIGN PATENT DOCUMENTS

| JP | 2012-185771 A | 9/2012 |
|---|---|---|
| KR | 10-2012-0103417 A | 9/2012 |

\* cited by examiner

FIG.7

| Algorithm 1: Merging Overlapped I/Os |
|---|
| *EO* is end_offset <br> *OW* is overlap_window <br> forall *entry ∈ file range list* do <br>     if *is_overlapped(entry, OW)* then <br>         *count++* <br>         if *entry.EO > OW.EO* then <br>             *OW.EO = entry.EO* <br>     else <br>         *store(OW, count)* <br>         *OW = entry* |

Ext4

F2FS

Btrfs

Ext4

F2FS

Btrfs

FILE FRAGMENTATION REMOVAL METHOD AND DEVICE

CROSS-REFERENCE TO RELATED APPLICATIONS

This application claims the benefit under 35 USC 119(a) of Korean Patent Application No. 10-2021-0166616 filed on Nov. 29, 2021, in the Korean Intellectual Property Office, the entire disclosure of which is incorporated herein by reference for all purposes.

BACKGROUND

1. Field

The present disclosure relates to a file fragmentation removal method and device.

2. Description of the Related Art

File fragmentation means that files in a filesystem layer are not allocated one continuous block but are allocated several fragmented blocks. That is, in the filesystem layer, a logical block address (LBA) of the data block included in one file is not contiguous.

The causes of file fragmentation vary depending on a type of filesystem, but file fragmentation is unavoidable in most filesystems when the filesystem is continuously used. The file fragmentation adversely affects block input/output (I/O) performance for various reasons. Among them, excessive I/O requests may occur at a kernel layer due to the effect of file fragmentation. In the case of an application layer or a virtual filesystem (VFS) layer, which is a layer higher than the filesystem, one file is accessed as an offset, whereas in the case of the filesystem, the file is accessed through the LBA.

However, referring to FIG. 5, 'bio' and 'request' structures used when transferring input/output (I/O) from the filesystem to the block layer may represent consecutive blocks on the LBA. Therefore, when the file fragment has occurred even if the application requests one read system call, the file fragment is converted into multiple requests (request splitting). At this time, file fragmentation degrades I/O performance from the point of view of the application because an I/O completion signal is sent to the application only when all requests derived from the corresponding system call are processed.

Because of small I/O requests and their randomness inside the storage device, the resources inside the storage device are not fully utilized. In order to solve this problem, conventionally, a fragmentation removal technique of moving an entire file or folder to a new location has been used. However, since this fragmentation removal technique generates a huge amount of additional writes, the performance of other applications running together is degraded and the time required for fragmentation is increased. In addition, since recent storage devices have a predetermined lifespan, additional write operations caused by fragmentation removal may adversely affect the lifespan of these storage devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a file fragmentation removal method includes collecting input/output system call information of a plurality of file input/output system calls by an application of at least one target file used by an application operating on an arbitrary filesystem, generating a file range list of items comprising information on a start point, an end point, and an access count of input/output based on the input/output system call information, selecting a plurality of fragmentation target items based on the file range list and a predetermined threshold, and selectively removing fragmentation based on whether individual items of the plurality of fragmentation target items are fragmented.

In the generating of the file range list, when sections of each of the items including the start point and the end point overlap between individual input and output, an item determined by merging the sections and adding the access count may be included in the file range list.

In the generating of the file range list, when a sequential read is determined by comparing start points and end points of plural I/Os in the file range list, an item in the file range list may include information about the start point located in front among the plural I/Os, the end point determined by adding a size of a read ahead to the start point, and the access count of 1.

When the filesystem is an out-place update filesystem, the selectively removing of the fragmentation may include determining whether the individual items of the plurality of fragmentation target items are fragmented using mapping information of a file offset and a logical block address, and performing overwriting at the start point of each fragmented item among the plurality of fragmentation target items.

When the filesystem is an in-place update filesystem, the selectively removing of the fragmentation may include determining whether the individual items of the plurality of fragmentation target items are fragmented using mapping information of a file offset and a logical block address, allocating a contiguous block area to store data from the start point to the end point for each fragmented item among the plurality of fragmentation target items, and writing the data in the contiguous block area for each fragmented item among the plurality of fragmentation target items.

The start points and the end points may be aligned in underlying filesystem blocks.

In another general aspect, a file fragmentation removal device includes a collector configured to collect input/output system call information of a plurality of file input/output system calls by an application of at least one target file used by an application operating on an arbitrary filesystem, an analyzer configured to generate a file range list of items comprising information on a start point, an end point, and an access count of input/output based on the input/output system call information, a selector configured to select a plurality of fragmentation target items based on the file range list and a predetermined threshold, and a remover configured to selectively remove the fragmentation based on whether individual items of the plurality of fragmentation target items are fragmented.

When sections including the start point and the end point overlap between individual input and output, the analyzer may further include an item determined by merging the sections and adding the access count in the file range list.

When a sequential read is determined by comparing start points and end points of plural I/Os in the file range list, the analyzer may further include information about the start point located at in front among the plural I/Os, the end point determined by adding a size of a read ahead to the start point, and the access count of 1 in the file range list.

When the filesystem is an out-place update filesystem, the remover may be further configured to determine whether the individual items of the plurality of fragmentation target items are fragmented using mapping information of a file offset and a logical block address, and perform overwriting at the start point of each fragmented item among the plurality of fragmentation target items.

When the filesystem is an in-place update filesystem, the remover may further be configured to determine whether the individual items of the plurality of fragmentation target items are fragmented using mapping information of a file offset and a logical block address, allocate a contiguous block area to store data from the start point to the end point, and perform writing of the data in the contiguous block area of each fragmented item among the plurality of fragmentation target items.

The start points and the end points may be aligned in underlying filesystem blocks.

In another general aspect, a file fragmentation removal device includes one or more processors configured to collect input/output system call information of a plurality of file input/output system calls by an application of at least one target file used by an application operating on an arbitrary filesystem, generate a file range list of items comprising information on a start point, an end point, and an access count of input/output based on the input/output system call information, select a plurality of fragmentation target items based on the file range list and a predetermined threshold, and selectively remove the fragmentation based on whether individual items of the plurality of fragmentation target items are fragmented.

The file fragmentation removal device may further include a memory configured to store instructions. The one or more processors may further be configured to collect the input/output system call information of the plurality of file input/output system calls, generate the file range list of items, select the plurality of fragmentation target items, and selectively remove the fragmentation.

Other features and aspects will be apparent from the following detailed description, the drawings, and the claims.

BRIEF DESCRIPTION OF THE DRAWINGS

FIG. 7 is a diagram for describing a file range list according to one or more embodiments of the present disclosure.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
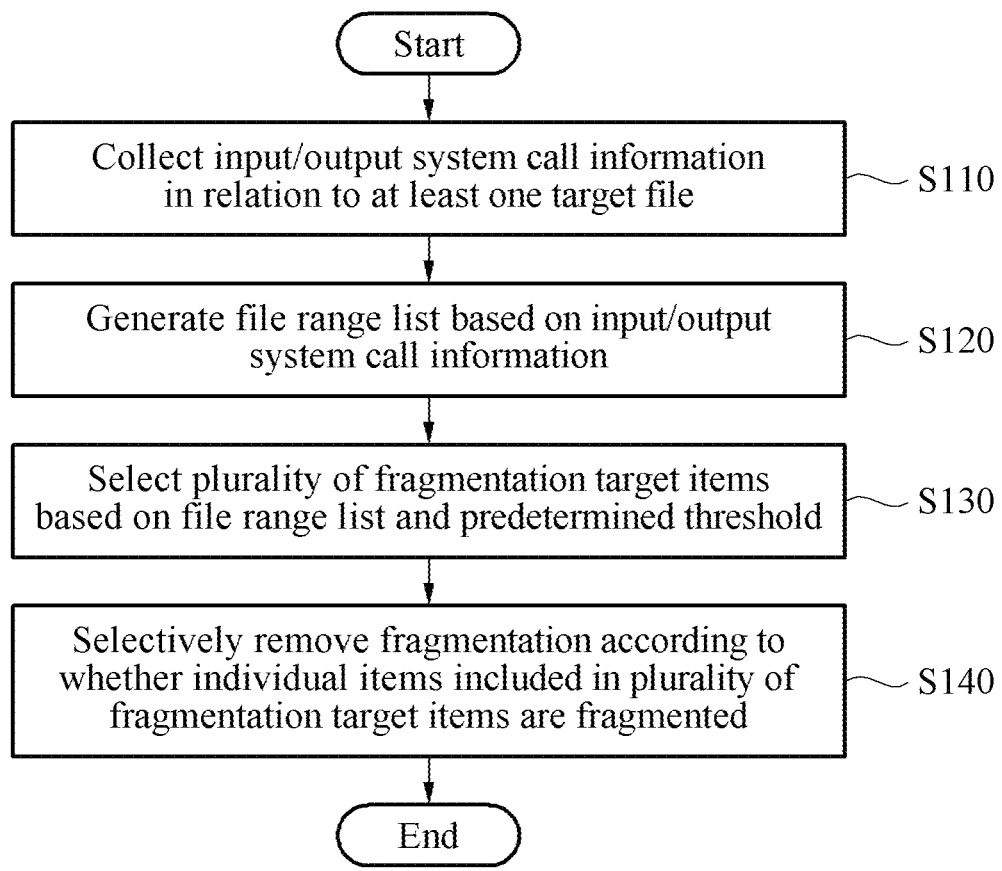
FIG. 1 is a flowchart illustrating a file fragmentation removal method according to one or more embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise contrarily defined, all terms used herein including technological or scientific terms have the same meanings as those generally understood after an understanding of the disclosure of this application. Terms which are defined in a generally used dictionary should be interpreted to have the same meaning as the meaning in the context of the related art, and are not interpreted as ideal or excessively formal meanings unless otherwise defined in the present application.

The present disclosure relates to a method and a device for removing file fragmentation from PCM-based SSDs, such as an embedded multi media card (EMMC), a solid state drive (SSD), a flash memory-based storage device, and an Optane SSD.

An object to be achieved by the present disclosure is to provide a file fragmentation removal method and device that selectively performs fragmentation removal on data that has a great influence on file I/O performance in consideration of the characteristics of a recent storage device without a seek time, thereby reducing the time desired for fragmentation removal and minimizing performance degradation of other applications.

FIG. 1 is a flowchart illustrating a file fragmentation removal method according to one or more embodiments of the present disclosure.

In this case, the file fragmentation removal method according to one or more embodiments of the present disclosure may refer to a method of removing fragmentation of at least one target file used by an application operating on an arbitrary filesystem.

In operation S110, the file fragmentation removal device collects input/output system call information, which is information of a plurality of file input/output system calls called by an application in relation to at least one target file.

Here, the file fragmentation removal device may collect input/output system call information to analyze the file input/output (I/O) activity of the application. More specifically, the file fragmentation removal device may monitor file I/O-related file input/output system calls (e.g., vfs_read( ) and vfs_write( )).

For example, a parameter of vfs_read( ) may include important I/O information such as a file structure and a file offset. That is, the file fragmentation removal device may acquire information about an I/O type, an inode number, an I/O size, and an I/O start point, and the like from the file input/output system call. In addition, the file fragmentation removal device may acquire information on whether or not a buffer is used by confirming an O_DIRECT flag of the system call.

In this case, the inode number is a unique number assigned to each file, and by using the number, it is possible to specify which file is an I/O target. In addition, the start point and size of I/O may be used to determine the range of a file block accessed through I/O.

Figure 6:
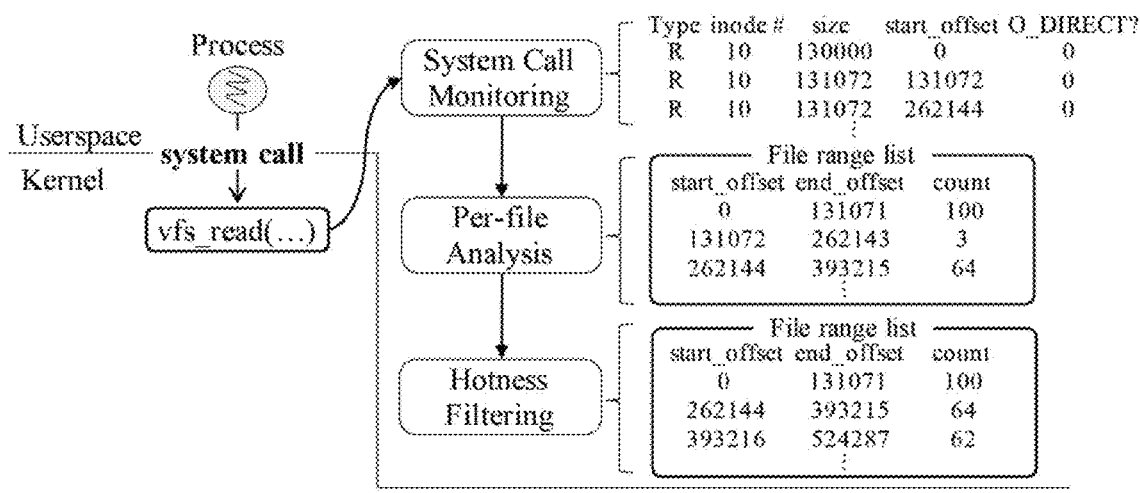
FIG. 6 is a diagram for describing a process of selecting a fragmentation target item according to one or more embodiments of the present disclosure.

More specifically, referring to FIG. 6, it may be confirmed that information about the type, inode, size, start offset, and O_DIRECT flag for I/O-related system calls is collected in a "System Call Monitoring" item.

In operation S120, the file fragmentation removal device generates a file range list including items including information on a start point, an end point, and an access count of input/output based on the input/output system call information.

In this case, the file fragmentation removal device may determine a path name of a specific target file using the inode number, and collect all I/O activities for the determined target file.

In addition, the file fragmentation removal device may calculate an end point by adding a start point and a size value of each item included in the input/output system call information. In addition, the file fragmentation removal device generates an item including the information on the start point, the end point, and the access count for each item included in the input/output system call information in relation to the determined target file to add the generated item to the file range list. However, if there are several items with the same start point and the same size (i.e., the same end point) in the input/output system call information, the file fragmentation removal device may increase the access count by 1 depending on the number thereof instead of adding all individual items to the file range list.

For example, when there are three items having the same start point and the same size in the input/output system call information, the file fragmentation removal device may add only one item including information on the same start point, the same end point, and the access count of 3 for the three items to the file range list.

More specifically, referring to FIG. 6, it can be seen that a file range list is shown in a "Per-file Analysis" item, and information about a start point (start offset), an end point (end offset), and an access count is included.

In another one or more embodiments, when sections consisting of a start point and an end point overlap with each other between individual input and output, the file fragment removal device may include an item obtained by merging the sections and adding the access count in the file range list.

In this case, each item included in the file range list may be sorted in ascending order based on the start point. Accordingly, the file fragmentation removal device may apply each item included in the file range list to FIG. 7 so that the duplicate items are merged, and then add the items to the file range list. In FIG. 7, overlap_window represents a current representative I/O section of merging overlapping I/Os.

For example, it can be assumed that two items having start points and end points of 1 to 40 and 31 to 60 (the access counts are all 1), respectively, are included in the input/output system call information. In this case, the file fragmentation removal device recognizes that the sections of two items overlap with each other in the section of 31 to 40 to merge the two items into the start point 1 and the end point 60, and may include the items in the file range list by setting the access count to 2. At this time, since the section merge has occurred, the file fragmentation removal device may delete the merged items, the start point and the end point of 31 to 60, from the file range list.

In yet another one or more embodiments, when it is determined as sequential read by comparing the start points and end points of N I/Os included in the file range list, for the N I/Os, the file fragmentation removal device may include, in the file range list, an item including information about a start point located at the front among the N I/Os, an end point by adding the size of a read ahead to the start point, and an access count of 1.

At this time, when it is determined that sequential read has occurred by comparing the start points and end points of the N I/Os included in the file range list, the file fragmentation removal device may consider that read ahead has occurred. In addition, the file fragmentation removal device may include in the file range list one item including information about the start point located at the front, the end point by adding the size of the read ahead to the start point, and the access count of 1. In this case, the file fragmentation removal device may delete N items corresponding to the N I/Os from the file range list.

This is because, when all N I/Os are processed by one read ahead, it is reasonable to consider that there was one system call rather than the N system calls. More specifically, this is because N-1 I/Os may be provided through a page cache instead of the system call.

In operation S130, the file fragmentation removal device selects a plurality of fragmentation target items based on the file range list and a predetermined threshold.

For example, the file fragmentation removal device may select an item having an access count equal to or greater than the threshold among items included in the file range list as a plurality of fragmentation target items. Alternatively, the file fragmentation removal device may sort the items included in the file range list in descending order with respect to the size of the access count, and then select higher items corresponding to the threshold as a plurality of fragmentation target items.

More specifically, referring to FIG. 6, it can be confirmed that a file range list is shown in a "Hotness Filtering" item, and the items are filtered based on the access count.

On the other hand, the threshold is not a fixed value, but may be a settable value.

Finally, in operation S140, the file fragmentation removal device selectively removes the fragmentation according to whether individual items included in the plurality of fragmentation target items are fragmented.

That is, the file fragmentation removal device may selectively remove fragmentation only in case of fragmentation after determining whether individual items included in the plurality of fragmentation target items previously determined have been actually fragmented.

In this case, detailed contents of removing the fragmentation by the file fragmentation removal device will be described below with reference to FIGS. 2 and 3.

In another one or more embodiments, the start points and the end points may be aligned in underlying filesystem blocks.

At this time, since the start points and the end points are aligned in the underlying filesystem blocks, even if the file fragmentation removal device calls a fallocate function in a buffer allocation process to be described below, zeroing does not occur and potential data loss does not occur.

Figure 2:
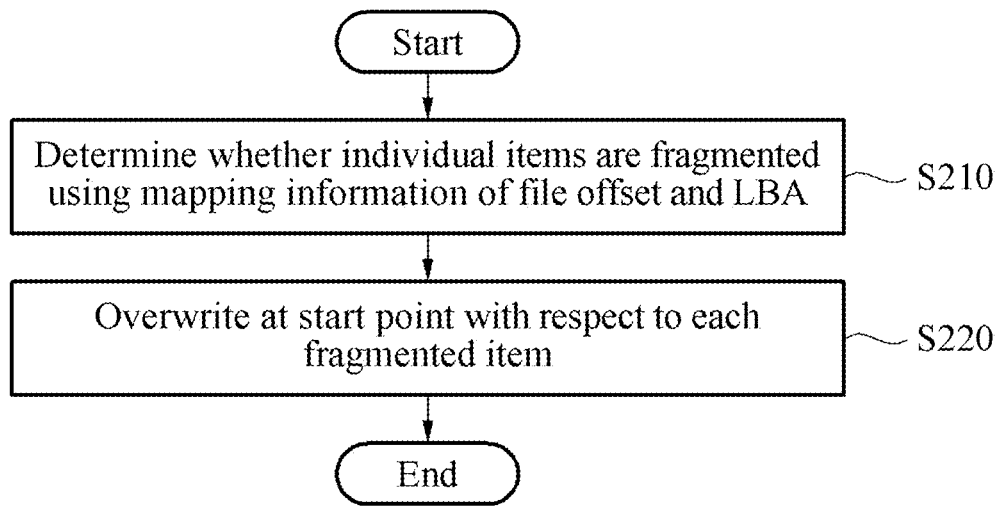
FIG. 2 is a flowchart illustrating a data movement method according to one or more embodiments of the present disclosure.

FIG. 2 is a flowchart illustrating a data movement method according to one or more embodiments of the present disclosure.

In this case, a filesystem may be an out-place update filesystem (e.g., F2FS, Btrfs, etc.).

In operation S210, the file fragmentation removal device determines whether individual items included in a plurality of fragmentation target items are fragmented using mapping information of a file offset and a logical block address.

In this case, the file fragmentation removal device may determine whether fragmentation has occurred in a range (i.e., from a start point to an end point) of individual items included in the plurality of fragmentation target items.

For example, the file fragmentation removal device may collect fragmentation information using a filefrag program, a FILEMAP ioctl, or the like. In addition, the file fragmentation removal device may acquire information on the LBA corresponding to the file offset from the collected information, and examine whether there is sequentiality in the LBA in the data of the range of the individual item.

Figure 8:
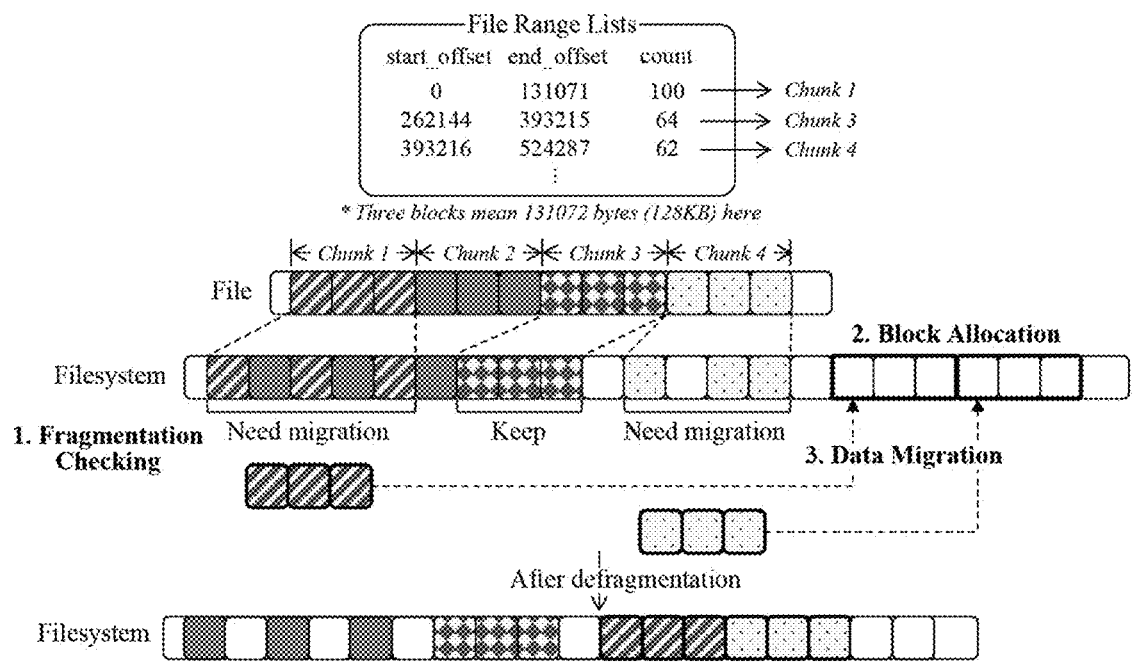
FIG. 8 is a diagram for describing a data movement process according to one or more embodiments of the present disclosure.

More specifically, referring to FIG. 8, the file fragmentation removal device may determine that chunk 3 is not fragmented. In addition, the file fragmentation removal device may determine that chunk 2 is not included in the plurality of fragmentation target items. (Accurately, chunk 2 may be seen to be fragmented, but is not included in the plurality of fragmentation target items, so that there is no need to determine whether chunk 2 is fragmented.) Finally, the file fragmentation removal device may determine that chunks 1 and 4 are fragmented, and since chunks 1 and 4 are also included in a plurality of fragmentation target items, fragmentation removal may be performed.

In operation S230, the file fragmentation removal device performs overwriting at the start point with respect to each fragmented item among the plurality of fragmentation target items.

At this time, in the out-place update filesystem, since data is guaranteed to move to a new area by simply performing overwriting of the same range, the file fragmentation removal device may perform the fragmentation removal by simply performing the overwriting.

Figure 3:
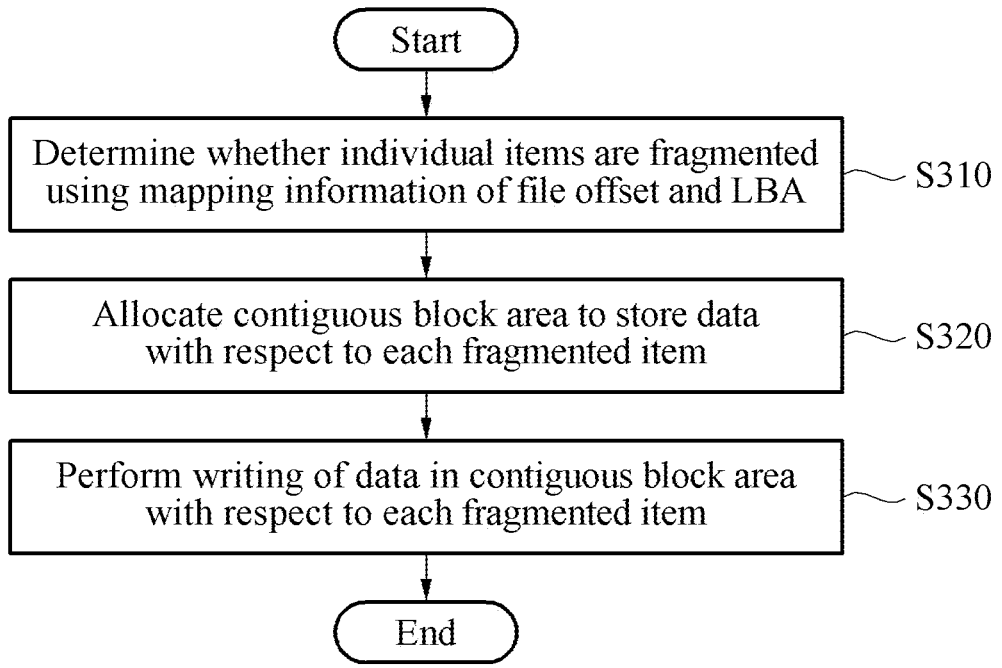
FIG. 3 is a flowchart illustrating a data movement method according to another one or more embodiments of the present disclosure.

FIG. 3 is a flowchart illustrating a data movement method according to another one or more embodiments of the present disclosure.

At this time, a filesystem may be an in-place update filesystem (e.g., Ext4, etc.).

In operation S310, the file fragmentation removal device determines whether individual items included in a plurality of fragmentation target items are fragmented using mapping information of a file offset and a logical block address.

In operation S320, the file fragmentation removal device allocates a contiguous block area to store data from a start point to an end point for each of the fragmented items among the plurality of fragmentation target items.

In this case, since the in-place update filesystem reuses an existing area for the update when overwriting of the same range is performed, the file fragmentation removal device needs to allocate a contiguous area in advance to remove the fragmentation.

In operation S330, the file fragmentation removal device performs writing of the data in the contiguous block area with respect to each fragmented item among the plurality of fragmentation target items.

That is, the fragmentation removal device may perform fragmentation removal by writing the data to the previously allocated contiguous block area.

Figure 9A:
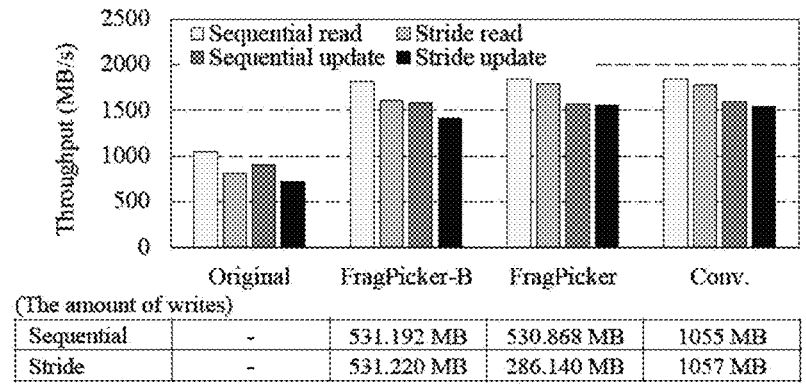
FIGS. 9A to 9C are diagrams for describing a comparative experiment result according to one or more embodiments of the present disclosure.
Figure 9B:
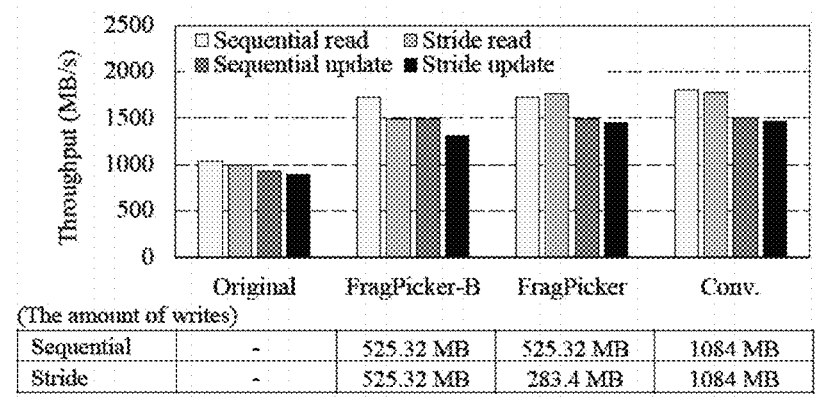
Figure 9C:
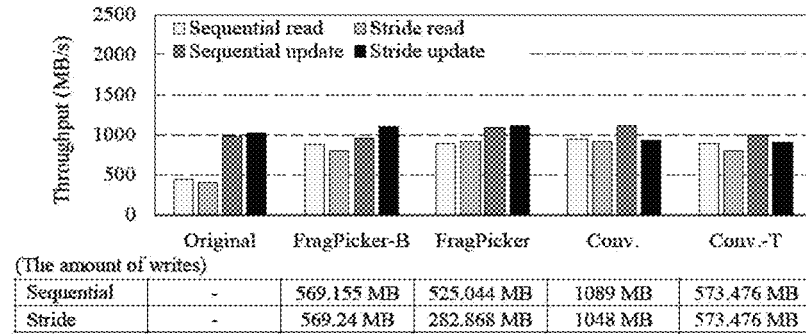

FIGS. 9A to 9C illustrate experimental results performed on an Intel 905P Optane SSD. As a result of the experiment, the writing amount generated during fragmentation removal compared to the related art was reduced by about 50% in the case of Sequential I/O, and by about 75% in the case of Stride I/O. In addition, compared to before fragmentation removal, Sequential/Stride Reads increased by 75% and 120%, respectively.

Figure 10A:
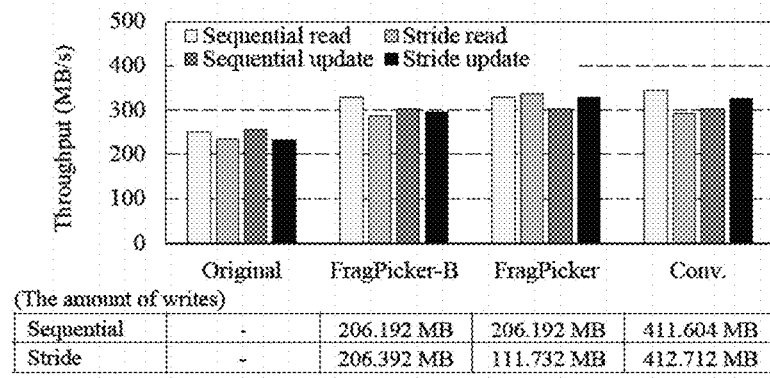
FIGS. 10A to 10C are diagrams for describing a comparative experiment result according to one or more embodiments of the present disclosure.
Figure 10B:
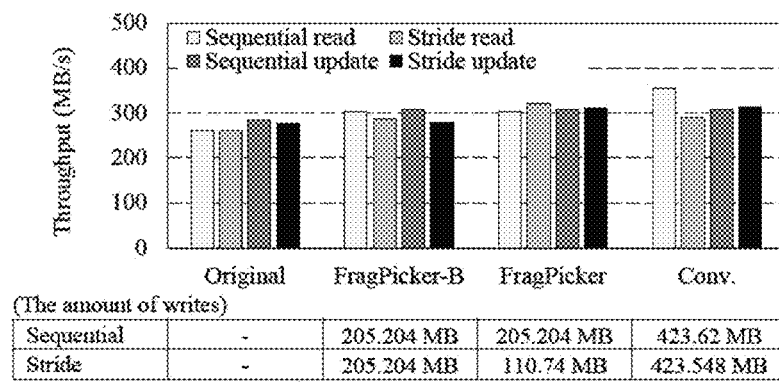
Figure 10C:
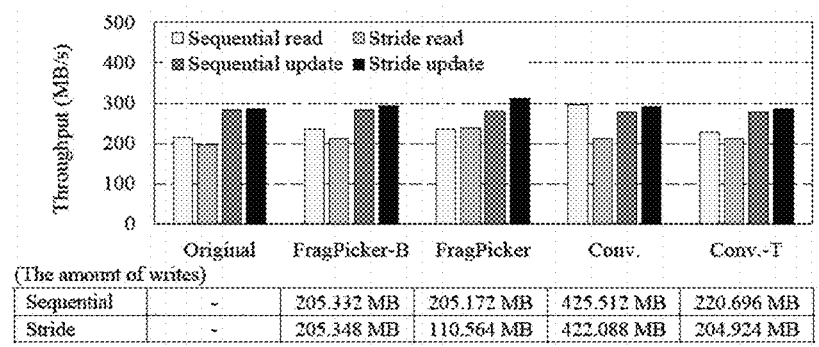

FIGS. 10A to 10C illustrate experimental results performed on a Samsung 850PRO SSD. As a result of the experiment, the writing amount generated during fragmentation removal compared to the related art was reduced by about 50% in the case of Sequential I/O, and by about 75% in the case of Stride I/O. In addition, compared to before fragmentation removal, Sequential/Stride Reads increased by 30% and 42%, respectively. In the case of Stride Read, the performance was about 15% higher than that of the conventional technique.

Figure 4:
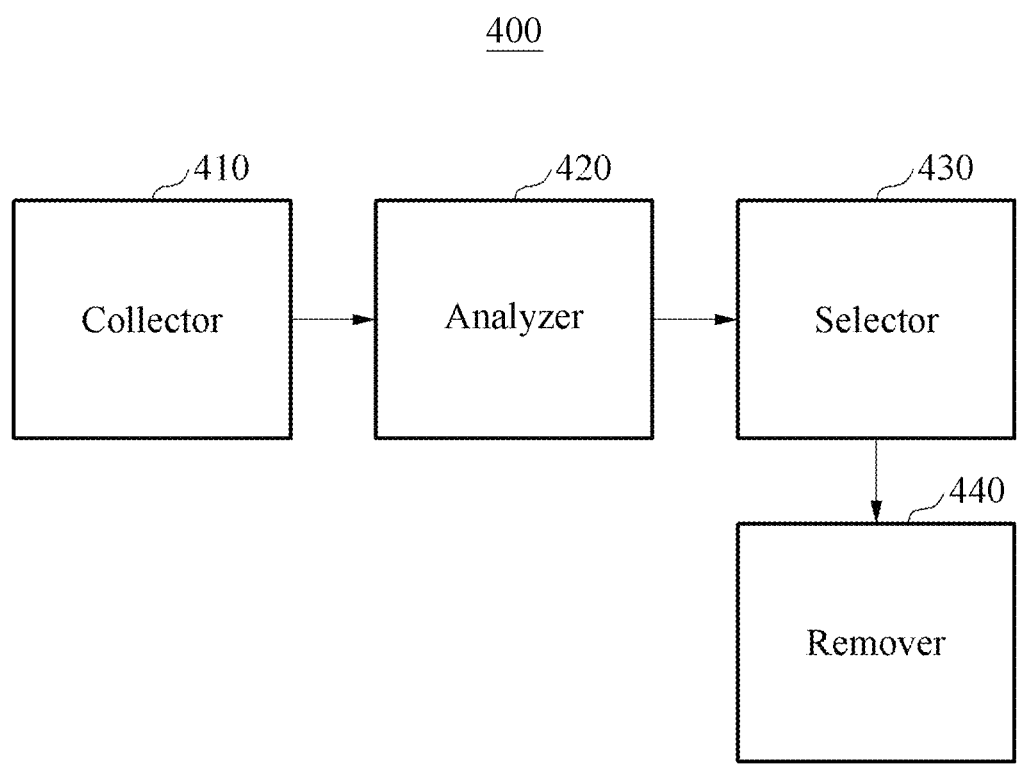
FIG. 4 is a block diagram illustrating a file fragmentation removal device according to one or more embodiments of the present disclosure.
Figure 5:
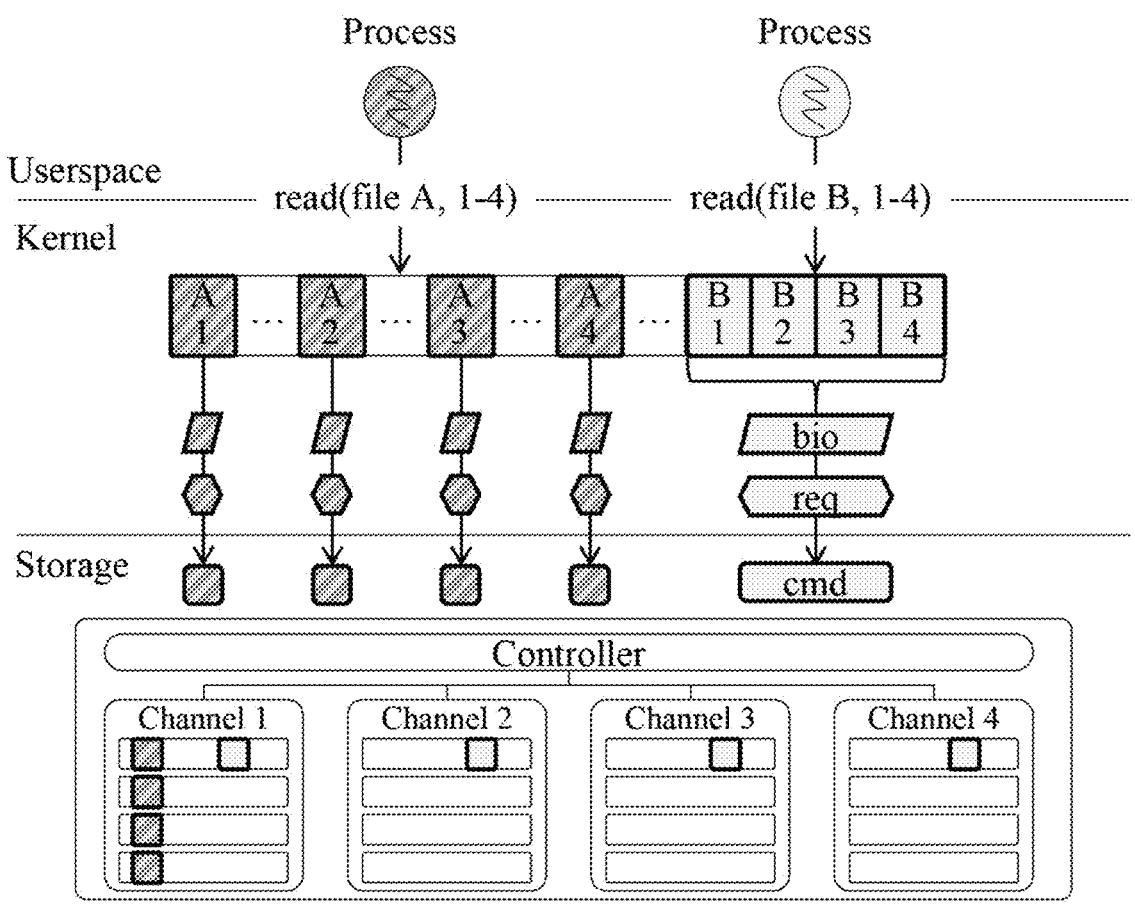
FIG. 5 is a diagram for describing a file fragmentation problem according to one or more embodiments of the present disclosure.

FIG. 4 is a block diagram illustrating a file fragmentation removal device according to one or more embodiments of the present disclosure.

Referring to FIG. 4, a file fragmentation removal device 400 according to one or more embodiments of the present disclosure includes a collector 410, an analyzer 420, a selector 430, and a remover 440.

Meanwhile, the file fragmentation removal device 400 according to the exemplary embodiment of the present disclosure is mounted on a computing device with an executable application, such as a smartphone, a tablet PC, a desktop PC, a notebook PC, and a server computer, and may be used to remove the file fragmentation of a connected storage device (EMMC, SSD, etc.).

The collector 410 collects input/output system call information, which is information of a plurality of file input/output system calls called by an application in relation to at least one target file.

The analyzer 420 generates a file range list including items including information on a start point, an end point, and an access count of input/output, based on the input/output system call information.

In another one or more embodiments, when sections consisting of a start point and an end point overlap with each other between individual input and output, the analyzer 420 may include an item obtained by merging the sections and adding the access count in the file range list.

In yet another one or more embodiments, when it is determined as sequential read by comparing the start points and end points of N I/Os included in the file range list, with respect to the N I/Os, the analyzer 420 may include, in the file range list, an item including information about a start point located at the front among the N I/Os, an end point by adding the size of a read ahead to the start point, and an access count of 1.

The selector 430 selects a plurality of fragmentation target items based on the file range list and a predetermined threshold.

Finally, the remover 440 selectively removes fragmentation according to whether individual items included in the plurality of fragmentation target items are fragmented.

In another one or more embodiments, if the filesystem is an out-place update filesystem, the remover 440 determines whether individual items included in the plurality of fragmentation target items are fragmented by using mapping information of the file offset and the logical block address, and may perform overwriting at the start point with respect to each fragmented item among the plurality of fragmentation target items.

In yet another one or more embodiments, if the filesystem is an in-place update filesystem, the remover 440 may determine whether individual items included in the plurality of fragmentation target items are fragmented by using mapping information of the file offset and the logical block address, allocate a contiguous block area to store data form the start point to the end point, with respect to each fragmented item among the plurality of fragmentation target items, and perform the writing of the data in the contiguous block area.

In yet another one or more embodiments, the start and end points may be aligned in underlying filesystem blocks.

Furthermore, the present disclosure may be utilized not only in a flash memory such as an Optane SSD, but also in a PCM-based SSD.

The disclosed file fragmentation removal method and device may minimize the effect on performance degradation of the system or the lifetime degradation of the storage device while overcoming the problems of the conventional fragmentation removal technique.

The file fragmentation removal device, collector, analyzer, selector, remover in FIGS. 1-10C that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10C that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for removing file fragmentation from a storage device, comprising:
    collecting input/output system call information of a plurality of file input/output system calls by an application of at least one target file used by an application operating on an arbitrary filesystem of the storage device;
    generating a file range list of items comprising information on a start point, an end point, and an access count of input/output based on the input/output system call information, wherein when sections of each of the items comprising the start point and the end point overlap between individual input and output, an item determined by merging the sections and adding to the access count is comprised in the file range list;
    deleting the items from the file range list when the items have been merged;
    selecting a plurality of fragmentation target items based on the file range list and a predetermined threshold; and
    selectively removing fragmentation from the storage device based on whether individual items of the plurality of fragmentation target items are fragmented, wherein when the filesystem is an in-place update filesystem,
    the selectively removing of the fragmentation comprises:
        determining whether the individual items of the plurality of fragmentation target items are fragmented using mapping information of a file offset and a logical block address;

allocating a contiguous block area to store data from the start point to the end point for each fragmented item among the plurality of fragmentation target items, wherein the start points and the end points are aligned in underlying filesystem blocks; and writing the data in the contiguous block area for each fragmented item among the plurality of fragmentation target items.

2. The method of claim 1, wherein in the generating of the file range list, when a sequential read is determined by comparing start points and end points of plural I/Os in the file range list, an item in the file range list comprises information about the start point located in front among the plural I/Os, the end point determined by adding a size of a read ahead to the start point, and the access count of 1.

3. The method of claim 1, wherein when the filesystem is an out-place update filesystem, the selectively removing of the fragmentation comprises:
determining whether the individual items of the plurality of fragmentation target items are fragmented using mapping information of a file offset and a logical block address; and performing overwriting at the start point of each fragmented item among the plurality of fragmentation target items.

4. A file fragmentation removal device, comprising:
one or more processors;
a collector configured to collect input/output system call information of a plurality of file input/output system calls by an application of at least one target file used by an application operating on an arbitrary filesystem of a storage device;

an analyzer configured to generate a file range list of items comprising information on a start point, an end point, and an access count of input/output based on the input/output system call information, wherein when sections comprising the start point and the end point overlap between individual input and output, the analyzer is further configured to merge the sections and add to the access count in the file range list and delete the items from the file range list which were merged;

a selector configured to select a plurality of fragmentation target items based on the file range list and a predetermined threshold; and a remover configured to selectively remove the fragmentation from the storage device based on whether individual items of the plurality of fragmentation target items are fragmented, wherein when the filesystem is an in-place update filesystem, the remover is further configured to
determine whether the individual items of the plurality of fragmentation target items are fragmented using mapping information of a file offset and a logical block address, allocate a contiguous block area to store data from the start point to the end point, wherein the start points and the end points are aligned in underlying filesystem blocks, and perform writing of the data in the contiguous block area of each fragmented item among the plurality of fragmentation target items.

5. The file fragmentation removal device of claim 4, wherein when a sequential read is determined by comparing start points and end points of plural I/Os in the file range list, the analyzer further comprises information about the start point located at in front among the plural I/Os, the end point determined by adding a size of a read ahead to the start point, and the access count of 1 in the file range list.

6. The file fragmentation removal device of claim 4, wherein when the filesystem is an out-place update filesystem, the remover is further configured to determine whether the individual items of the plurality of fragmentation target items are fragmented using mapping information of a file offset and a logical block address, and perform overwriting at the start point of each fragmented item among the plurality of fragmentation target items.

7. A file fragmentation removal device, comprising:
one or more processors configured to:
collect input/output system call information of a plurality of file input/output system calls by an application of at least one target file used by an application operating on an arbitrary filesystem of a storage device;

generate a file range list of items comprising information on a start point, an end point, and an access count of input/output based on the input/output system call information, wherein when sections of each of the items comprising the start point and the end point overlap between individual input and output, an item determined by merging the sections and adding to the access count is comprised in the file range list;

delete the items from the file range list when the items have been merged;

select a plurality of fragmentation target items based on the file range list and a predetermined threshold; and selectively remove the fragmentation from the storage device based on whether individual items of the plurality of fragmentation target items are fragmented, wherein when the filesystem is an in-place update filesystem, the selectively removing of the fragmentation comprises:
determining whether the individual items of the plurality of fragmentation target items are fragmented using mapping information of a file offset and a logical block address;

allocating a contiguous block area to store data from the start point to the end point for each fragmented item among the plurality of fragmentation target items, wherein the start points and the end points are aligned in underlying filesystem blocks; and writing the data in the contiguous block area for each fragmented item among the plurality of fragmentation target items.

8. The file fragmentation removal device of claim 7, further comprising a memory configured to store instructions;

wherein the one or more processors are further configured to
collect the input/output system call information of the plurality of file input/output system calls,
generate the file range list of items,
select the plurality of fragmentation target items, and
selectively remove the fragmentation.

* * * * *